(12) United States Patent
Schlereth et al.

(10) Patent No.: US 7,231,398 B2
(45) Date of Patent: Jun. 12, 2007

(54) PROVISION OF INFORMATION IN AN AUTOMATION SYSTEM

(75) Inventors: Michael Schlereth, Wilhermsdorf (DE); Peter Wagner, Hersbruck (DE)

(73) Assignee: Siemens Aktiengesellschaft, Munich (DE)

( * ) Notice: Subject to any disclaimer, the term of this patent is extended or adjusted under 35 U.S.C. 154(b) by 296 days.

(21) Appl. No.: 10/494,737

(22) PCT Filed: Oct. 21, 2002

(86) PCT No.: PCT/DE02/03970

§ 371 (c)(1),
(2), (4) Date: May 5, 2004

(87) PCT Pub. No.: WO03/040842

PCT Pub. Date: May 15, 2003

(65) Prior Publication Data

US 2005/0015398 A1    Jan. 20, 2005

(30) Foreign Application Priority Data

Nov. 9, 2001    (DE) ............................... 101 55 090

(51) Int. Cl.
*G06F 17/00* (2006.01)
*G06F 13/00* (2006.01)

(52) U.S. Cl. ...................... 707/102; 711/117
(58) Field of Classification Search .................. 707/1, 707/9, 100–102; 709/203; 705/7–9; 711/117
See application file for complete search history.

(56) References Cited

U.S. PATENT DOCUMENTS

| 5,432,931 | A | * | 7/1995 | Woess et al. | ................. | 707/10 |
| 5,829,053 | A | * | 10/1998 | Smith et al. | ................. | 711/202 |
| 6,311,252 | B1 | * | 10/2001 | Raz | ........................... | 711/117 |
| 6,725,227 | B1 | * | 4/2004 | Li | ............................ | 707/102 |
| 6,920,558 | B2 | * | 7/2005 | Sames et al. | ................ | 713/166 |
| 6,944,662 | B2 | * | 9/2005 | Devine et al. | ............... | 709/225 |

(Continued)

FOREIGN PATENT DOCUMENTS

DE    197 42 448 C1    12/1998

(Continued)

OTHER PUBLICATIONS

Jayant Kumar and Steve Widergren; "Skills for Power System Software Engineering A Vendor's Perspective"; IEEE Power Engineering Society Summer Meeting; Jul. 15-19, 2001: pp. 1083-1084; vol. 2.

A. De Vos, S.E. Widergren, J. Zhu; "XML for CIM Model Exchange"; 22$^{nd}$ IEEE Power Engineering Society International Conference on Power Industry Computer Applications; May 20-24, 2001; pp. 31-37.

(Continued)

*Primary Examiner*—Don Wong
*Assistant Examiner*—Hung Tran Vy

(57) ABSTRACT

The invention relates to a system and a method for providing information in an automation system, which permits scaled access to said information. The system contains storage means for storing information in the form of an information hierarchy, whereby said storage means form hierarchical tiers and to enhance the information the system comprises first storage means of lower-level hierarchical tiers for the provision of information to second storage means of higher-level hierarchical tiers. The system also contains an engineering system for generating the information from projected information of the automation system and for the automatic projection of the storage means and access means, for accessing the stored information.

17 Claims, 4 Drawing Sheets

U.S. PATENT DOCUMENTS

| | | |
|---|---|---|
| 6,947,951 B1 * | 9/2005 | Gill ......................... 707/104.1 |
| 6,950,871 B1 * | 9/2005 | Honma et al. .............. 709/226 |
| 2001/0056362 A1 * | 12/2001 | Hanagan et al. ................ 705/7 |
| 2002/0052862 A1 * | 5/2002 | Scott et al. .................... 707/1 |
| 2002/0095399 A1 * | 7/2002 | Devine et al. ................. 707/1 |
| 2002/0129032 A1 * | 9/2002 | Bakalash et al. ........... 707/101 |

FOREIGN PATENT DOCUMENTS

| | | |
|---|---|---|
| EP | 0 770 945 A1 | 5/1997 |
| EP | 1 045 302 A1 | 10/2000 |
| WO | WO 01/57606 A1 | 8/2001 |

OTHER PUBLICATIONS

JagJit Singh; "XML for Power Market Data Exchange"; IEEE Power Engineering Society Winter Meeting; Jan. 28-Feb. 1, 2001; pp. 755-756, vol. 2.

Frances M. Cleveland; "Information Exchange Modeling (IEM) and eXtensible Markup Language (XML) Technologies"; IEEE Power Engineering Society Winter Meeting; Jan. 23-27, 2000; pp. 145-150; vol. 1.

Steve Widergren, Arnold De Vos, and Jun Zhu; "XML for Data Exchange"; IEEE Power Engineering Society Summer Meeting: Jul. 18-22, 1999; pp. 840-842; vol. 2.

* cited by examiner

PROVISION OF INFORMATION IN AN AUTOMATION SYSTEM

CROSS REFERENCE TO RELATED APPLICATIONS

This application is the US National Stage of International Application No. PCT/DE02/03970, filed Oct. 21, 2002 and claims the benefit thereof. The International Application claims the benefits of European application No. 10155090.1 filed Nov. 9, 2001, both of the applications are incorporated by reference herein in their entirety.

FIELD OF INVENTION

The invention relates to a system of for provision of information in an automation system.

BACKGROUND OF THE INVENTION

Programmable automation systems, bus systems for controlling and/or adjusting Automation processes or plant generally contain what is known as a runtime system for runtime sequence control of an automation component, a machine or a system as well as what is referred to as an engineering system to create and edit control programs intended for execution in the run time system. Usually much of the information identifying that the automation system (see e.g. components of the automation system, technological relationships etc) is his only at available in the engineering system or can only be called via this system. Furthermore information is stored on central servers which perform the overall information processing.

SUMMARY OF THE INVENTION

The object of the invention is to provide information from an engineering system in such a way that scaled access to this information becomes possible.

This object is achieved by a system for provision of information in an automation system
  with storage means for storing information in the form of an information hierarchy, where this storage means forms hierarchy levels and where, to enrich the information, first storage means of subordinate hierarchy levels are provided to supply the information to second storage means of superordinate hierarchy levels,
  with an engineering system to generate the information from project planning information of the automation system and for automatic project planning of the storage means and
  with access means to access the stored information.

This object is achieved by a method for provision of and access to information in an automation system, by which method
  information is stored in storage means in the form of an information hierarchy, where the storage means form hierarchy levels and where, to enrich the information, first storage means of subordinate hierarchy levels supply the information to second storage means of superordinate hierarchy levels,
  an engineering system which generates information from project planning information of the automation system and automatically plans the storage means into the project and
  with access means by which the stored information is accessed.

With the system and method in accordance with the invention there can be successive scaled access to the information in an automation system which is currently required. In this case the information hierarchy is not linear but represents information in which in the sense of an automation pyramid information from a number of devices is compressed—becoming narrower at higher levels. The proposed solution connects this concept of information hierarchy with the idea of how this information hierarchy is to be project planned in a defined way. The invention thus prevents unnecessary redundant storage of the information and allows data to be held centrally which makes data management easier. In addition it ensures that the information is easy to expand without there having to be manual intervention at a central server. The system in accordance with the invention features standard interfaces so that the information can be easily accessed with the means of access.

In an advantageous embodiment of the invention the engineering system for generating contents of project planning and configuration of project planning is provided from the project planning information for transmission of the content and the configuration of the project planning in the syntax of a Markup Language to assign the contents to the hierarchy levels of the storage means and to store the contents in the relevant storage means. The project planning of the storage means is performed automatically by the engineering system. Both the content and also the configuration are created automatically from the engineering system. A Markup Language is for example a language which is defined with the aid of SGML (Standard Generalized Markup Language). SGML is defined by ISO Standard 8879. The Internet format HTML (Hypertext Markup Language) is also a Markup Language. A Markup Language describes the logical components of a document. Typically it contains commands for marking typical elements of the document, such as headings, paragraphs, lists, tables or references to graphics.

At run time information which originally comes from a control or relates to a control is advantageously enriched and/or compressed in a hierarchy of Web servers. For this purpose the storage means are embodied in a further embodiment of the invention as Web servers installed on processing units, in which case a scaling of the Web servers is provided depending on the performance of the relevant Web server and the processing units comprise one or more Web servers in each case. The information generated by the Engineering System can thus be distributed to a hierarchy of Web servers. In this case the number and the relevant power of the Web servers is scalable in the information hierarchy in accordance with the power (performance, memory, access paths/rights) of the relevant CPU (Central Processing Unit). By the use of this scalable hierarchy of Web servers scaled information can be provided automatically by the engineering system. Likewise a branch of the information streams to lower levels is possible so that for example messages in parallel information streams can be forwarded simultaneously to higher-ranking levels of the control and to an external observer (machine setter or similar).

In a further advantageous embodiment of the invention the project planning information of the Engineering System includes system information of the automation system and project data. The information of the engineering systems is stored in their project databases. The generated information for the information hierarchy, that is the Web servers for runtime access, is stored on the Web servers, for example on the control or on a system-wide Web server or PC which provides the appropriate services.

The option of assigning messages from a runtime system automatically to information of the information hierarchy enables, in a further embodiment of the invention for example, alarm messages to be enriched by explanatory message texts.

The advantage of uniform access to the information based on Internet technology provides a facility for storing the information in XML formats. XML (Extensible Markup Language) refers to a standardized language in Internet format which represents a subset of the SGML language mentioned above.

The merging of information of all levels of an automation system is achieved by using at the engineering system to generate the information from a Manufacturing Execution System and/or an Enterprise Resource Planning System. Conversely the Manufacturing Execution System or the Enterprise Resource Planning System are provided with simple access to information of all levels since this is present in the system in formats that can be read by all parties involved.

BRIEF DESCRIPTION OF THE DRAWINGS

The invention is described and explained in more detail below on the basis of the exemplary embodiments shown in the Figures.

The diagrams show.

DETAILED DESCRIPTION OF THE INVENTION

Figure 1:
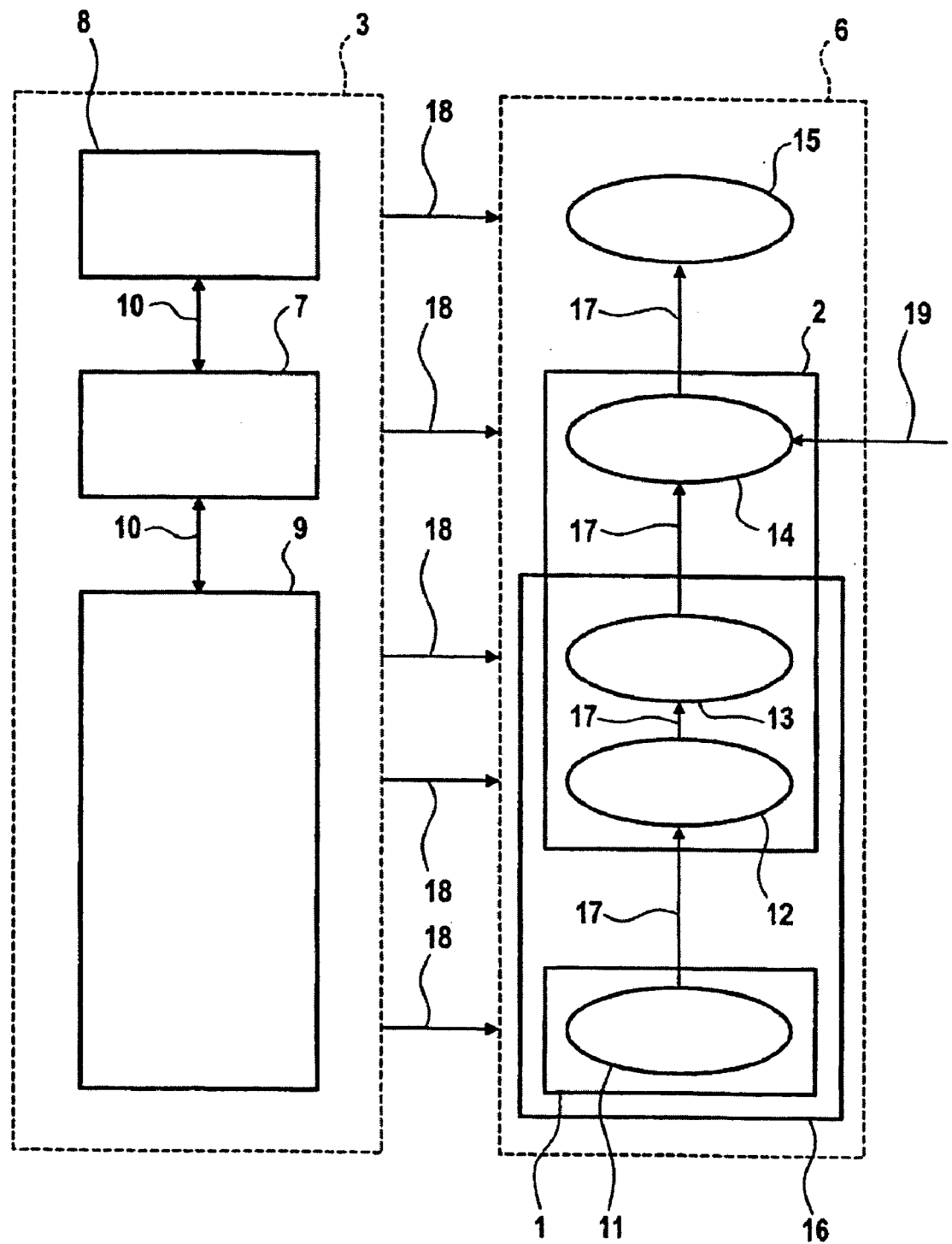
FIG. 1 a schematic diagram of a system for providing information in an automation system, FIG. 2 a further embodiment of a system for providing information in an automation system, FIG. 3 a schematic diagram of an XML processor pipeline and FIG. 4 an overview of the structure of a UMC system.

FIG. 1 shows a schematic diagram of a system for provision of information in an automation system. The system contains an engineering system 3 and a runtime system 6. The engineering system 3 features three levels: An automation level 9, a Manufacturing Execution System 7 (abbreviated to MES) as well as an Enterprise Resource Planning level 8 (abbreviated to ERP). The three levels exchange data 10. The runtime system 6 of the exemplary embodiment contains three processor units 1, 2, 16 which feature storage means 11 to 15 which are embodied here as Web servers. The hierarchically arranged storage means 11 to 15 contain information from which the subordinate levels provide the superordinate levels with subinformation 17. The information on the storage means 11 to 15 of the runtime system 6 is generated from the project planning information of the engineering system 3. This process of generating information is identified by reference number 18 And includes the mechanisms explained further on in this document of the XML processor pipeline, i.e. the provision and processing of data in accordance with specific (processor) rules as well as the provision of information in formats which allow direct incorporation on the Web servers (e.g. in HTML format).

The basic idea of the invention is explained below with reference to FIG. 1. The invention relates to a system and method for accessing information in automation systems. This system and method is based on Internet technology, i.e. Internet protocols, Internet formats (HTML, XML) and Internet mechanisms such as Webserver and Webclient are used. A normal engineering system 3 of an automation system can be roughly divided into three levels. The topmost level forms the ERP level 8, that is the corporate control or corporate planning level. Below this is the operational control or production planning level, also referred to as MES level 7. The lowest level is the control, production or automation level 9. The three levels of the engineering system 3 exchange data 10 with each other which, as XML data for example, features a uniform format which is understood by all communication partners involved. Corresponding to the hierarchical sub-division of the engineering system 3, the information 11 to 15 is mapped in the runtime system in hierarchy levels. The mapping 18 of the information of the engineering system 3 into the information stored in the storage means 11 to 15 in the runtime system occurs automatically. The idea of the invention is for the engineering system to support the project planning of this information hierarchy, i.e. the individual Web servers connected in series. Each hierarchy level of the information hierarchy is automatically filled by the engineering system. The information hierarchy level which contains a text for a message number for example is automatically informed by the engineering system how the text can be found on the basis of an alarm number. This produces a database in which the alarm numbers are assigned to corresponding texts. At its upwards connection, the Web server of this information hierarchy level offers information in HTML format which is already enriched by the text or also extended XML formats. Typically the MES functionality 7 will be implemented on a separate server, a process control computer. This process control computer can access the lower levels of the information hierarchy directly in order to fetch the appropriate information from control level 9. It is possible to uncouple the engineering system 3 at run time since all data which is needed is present in the information hierarchy. With previous usual systems for provision of information in an automation system Web servers are provided which each offer a specific functionality. The project planning of these Web servers is not supported by the engineering system but requires intervention by a programmer in each case who must assemble the corresponding information on the relevant server himself.

In the exemplary embodiment an alarm is generated in runtime system 6. Initially with this alarm is the only present in the form of a binary alarm number in storage means 11 and this forms the lowest level of the information hierarchy. In the system proposed here this information, so that it can be usefully accessed, is made available with Internet technologies, e.g. in XML, i.e. the raw data alarm number is made available as XML. Building on this basic information, an information hierarchy is constructed which is mapped into a hierarchy of Web servers. The system now automatically makes the binary alarm number available in XML format. In the next step this information 17 is passed on to the next-higher level in storage means 12. At the next level of the information hierarchy in storage means 12 the information is enriched by an alarm text assigned to the relevant alarm number, e.g. "end switch reached". Other conceivable hierarchy levels (storage means 13 and 14) are for example to provide the help text for the relevant alarm or a link 19 to the machine manufacturer. Also conceivable is generation of information from this alarm number in an alarm overview (storage means 15), e.g. a statement indicating whether there is already a fault in the system or whether it is continuing to operate despite the alarm. This means that the hierarchy of information is made accessible for each level in a separate Web server which also hierarchically structured, with the higher-level Web servers using the lower hierarchy levels to obtain the information. In this case precisely one Web server or a plurality of Web servers can be installed on one physical device, e.g. a processor unit 1, 2, 16. This allows any segments of a hierarchy to be combined together on one device in each case. The system has very good scalability. In the minimum case only one Web server, which transfers the alarm number as information in XML is realized on the controller. The further hierarchy levels of this information hierarchy, again also in the form of series-connected Web servers, are realized on a PC server. It is also possible to provide the controller with just the alarm number but also with the complete text with help information. This hierarchy can continue right up to the top of the automation pyramid. There is the option of entering this hierarchy from the side, i.e. accessing the raw data in order to process it further. The combination of a number of hierarchy levels in a Web server by combining processor functions is also possible.

Figure 2:
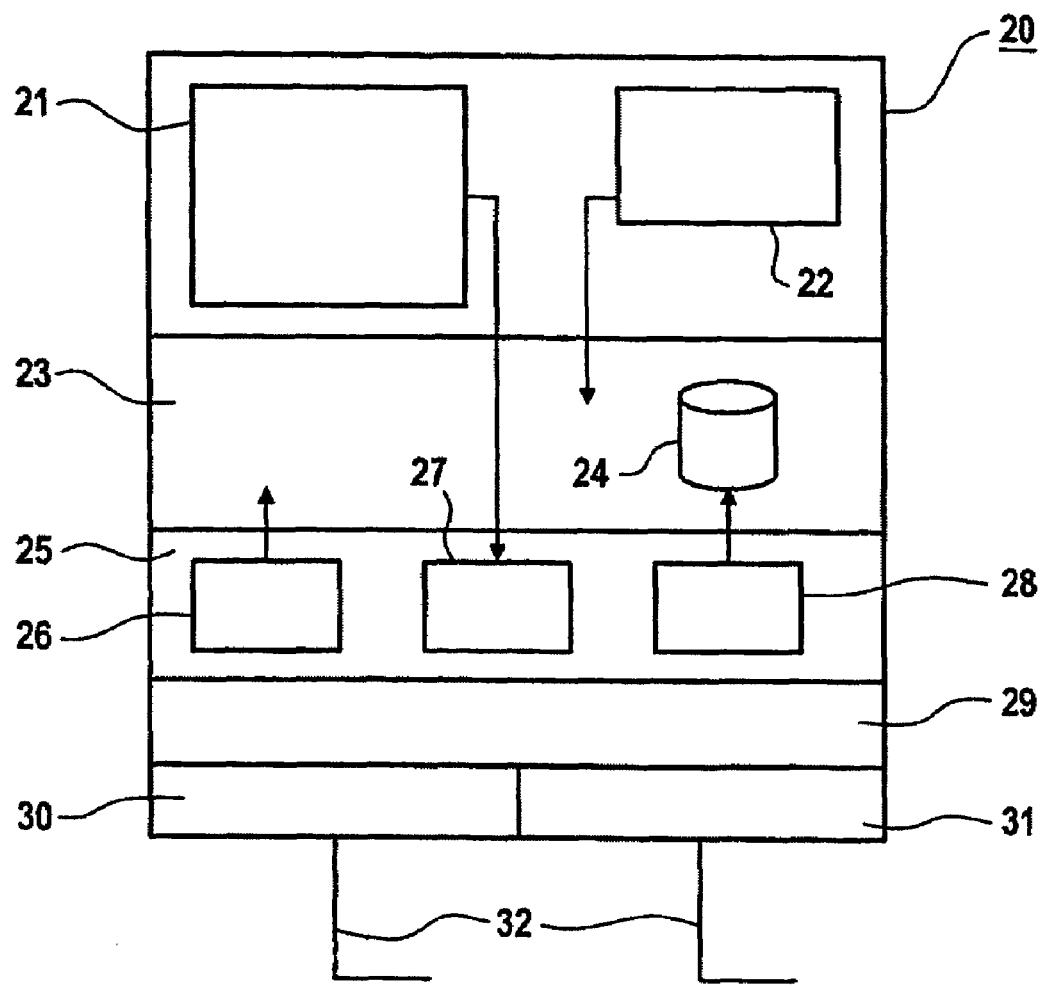

FIG. 2 shows and embodiment of the system for provision of information in a Universal Motion Control System 20 (abbreviated to UMC system). The UMC system 20 allows access to automation devices from any location. The runtime system 23 which implements the PLC (abbreviation for Programmable Logic Controller) functionality is controlled by user programs 21 and technology packages 22. The runtime system 23 also contains storage means in the form of file systems 24, which contain the project planning data from the engineering system. Various internet-based access means 25 are used to access the runtime system 23 and the user program 21. In detail these are HTTP servers 26 (Hypertext Transfer Protocol), SMTP servers 27 (Simple Mail Transfer Protocol) and FTP servers 28 (File Transfer Protocol). Lower down is a communication level 29, based on TCP (Transmission Control Protocol). Interworking with the hardware is for example via Profibus 30 or Ethernet 31, with a connection 32 to the periphery in each case.

Figure 3:
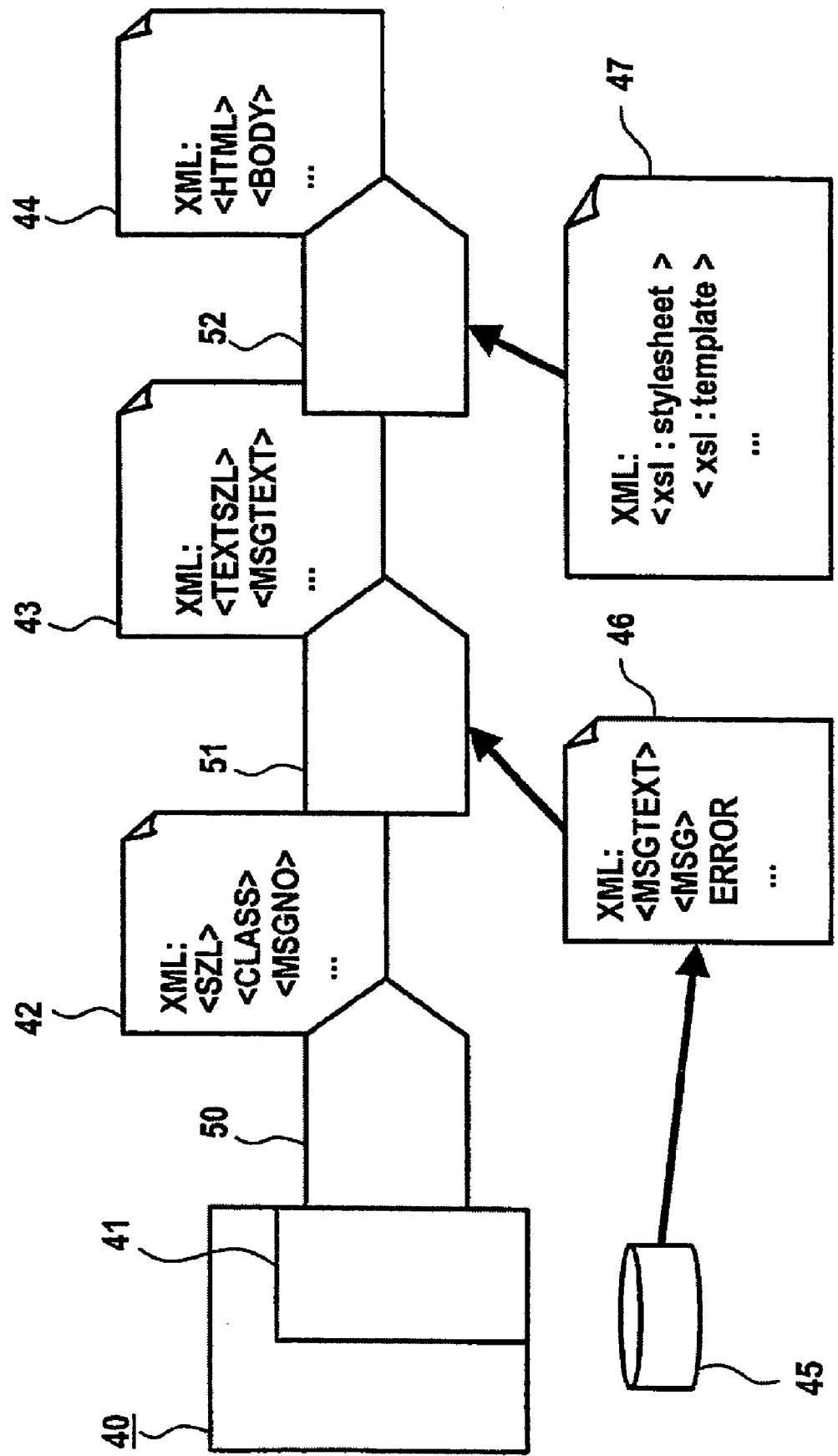

FIG. 3 shows a so-called XML processor pipeline, i.e. The successive processing of data with the so-called XML processors which run on the Web servers. Programs which read in XML documents need a processing module, also called an XML processor. The XML processor is responsible for the content of the XML document being made available in a suitable data structure to a processing application. To do this the XML processor combines the functions of conversion and transmission, i.e. it also serves as a transmitter for transmitting from server to server. In the exemplary embodiment of the editing of a diagnostic text shown in FIG. 3, a UMC runtime system 40 contains a system status list 41 which contains binary data. Such a system status list is for example a diagnostic buffer which contains alarm numbers. A first XML processor 50 transfers the content and the structures of the system status list 41 into document 42 in XML format. with a second XML processor 51 the document 42 is linked to further data 46 in XML format, which originates from database 45 and as a result of the link, a new document 43 enriched by information is created. In the example shown an alarm number in XML document 42 is assigned a message text, also in XML format, from data 46 by the second XML processor. A third XML processor 52 finally links the document 43 enriched in this way with formatting information 47 and creates an XML document 44 which displays the information contained in HTML format. To do this the third XML processor 52 uses the formatting information 47 which is present as XSL data. XSL (Extensible Stylesheet Language) is an extended Markup Language for describing stylesheets. This provides a simple method of for example switching between two languages, with an XML processor using XSL data for example to undertake a one-to-one conversion of German into English. that is conversion of the generated alarm messages by a corresponding XML processor into e-mail, files, fax etc. to notify a user is possible. For a specific project status XML or XSL data is generated which the Web server of the corresponding hierarchy level then uses to compress the information. Consistency is thus produced by the fact that project planning data for a server is created directly from the engineering data present in database 45. Server project planning does not have to be modified manually.

Figure 4:
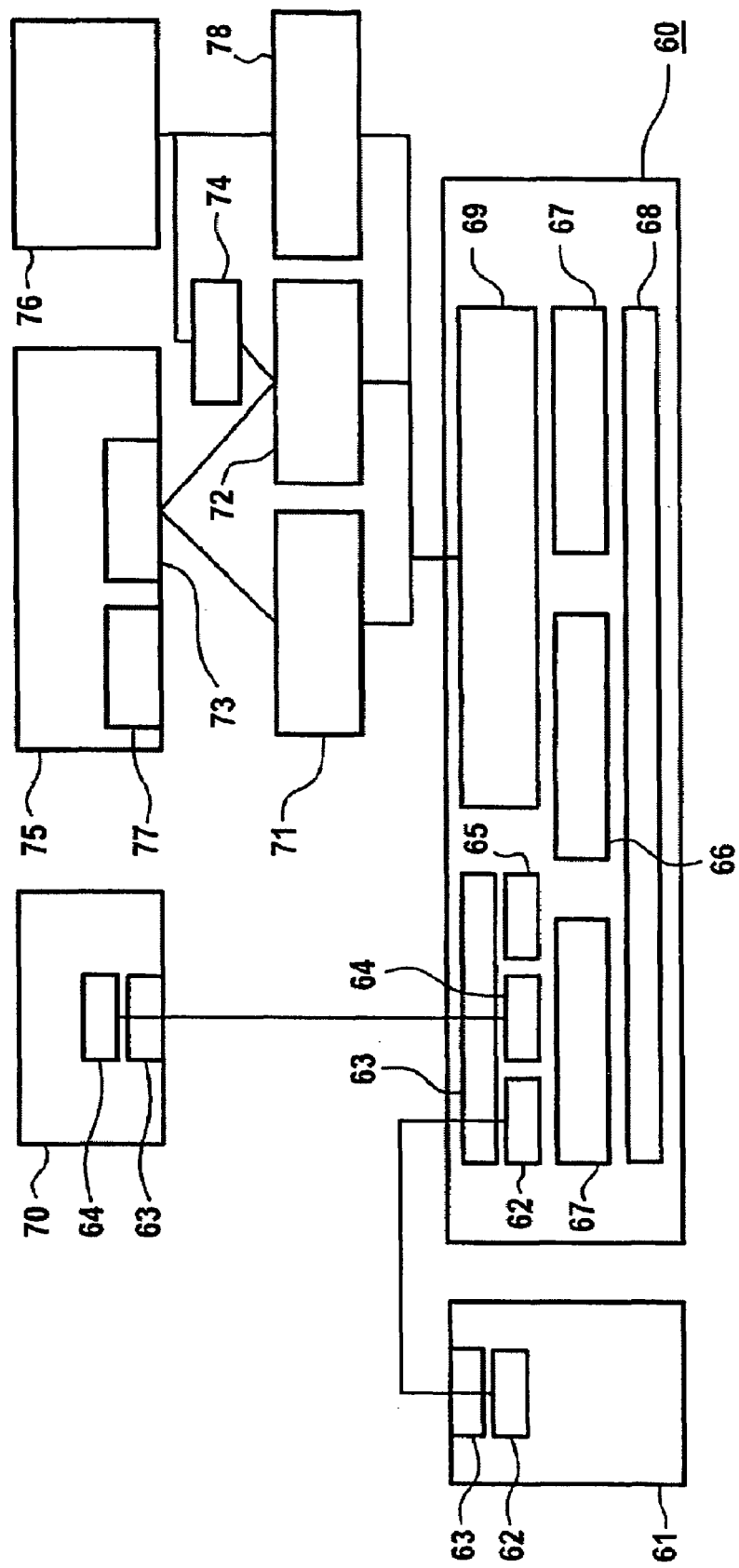

FIG. 4 shows the typical structure of a UMC system. The runtime system of the UMC system is implemented in the blocks identified by the reference numbers 60 or 61. The runtime system in the example is a Controller for a production machine. The two blocks 60, 61 of the controller are linked via TCP/IP (Transmission Control Protocol/Internet Protocol) interface 63 and RPC (Remote Procedure Calling) module 62. An external Web browser 70 communicates by means of HTTP 64 via a TCP/IP interface 63 with a Web server 67 of the controller or of the runtime system 60. Furthermore data in FTP format 65 can be transmitted via the TCP/IP interface 63 of the runtime system 60. AS well as the Web servers 62 the controller features a data server 66 and further servers 67. The controller runs with a real-time operating system 68, also a Numeric Robotic Kernel (NRK). Using a transmission protocol 69 (e.g. the S7 protocol from Siemens AG) runtime system 60 communicates with components 71 to 78 of an engineering system. The engineering system is also called Scout. It contains a first database 71 with information about hardware configurations and a second database 72 with technological information. The engineering system is operated by means of a user interface 75 which features a first interface 77 for exchanging XML data and a second interface 73 to databases 71, 72. Via an interface called the Object Manager 74 a tool 76 is included for engineering man-machine interfaces. A further tool 78 is used for project planning of the man-machine interface of the runtime system.

In summary the invention therefore relates to a system and a method for provision of information in an automation system which makes scaled access to this information possible. The system contains storage means 11 . . . 15 to store information in the form of an information hierarchy, where the storage means 11 . . . 15 for more hierarchy levels and where to enrich the information, first storage means 1 of subordinate hierarchy levels are provided to supply the information to second storage means 2 of superordinate hierarchy levels, an engineering system 3 for generating at the information from a project planning information of the automation system and for automatic project planning of the storage means 11 . . . 15 and access means 25 to access the stored information.

The invention claimed is:

1. A system for provision of information in an automation system, comprising:
   an engineering system for generating information indicative of a project planning;
   a plurality of storage devices for storing the information in the form of an information hierarchy, wherein the storage devices from hierarchy levels, and further wherein the plurality of storage devices is coupled to the engineering system for performing an automatic project planning;
   at least a first storage device of the plurality of storage devices being configured to store one or more subordinate hierarchy storage levels for mapping the information in accordance with the one or more subordinate hierarchy storage levels;

at least second storage device of the plurality of storage devices being configured to store one or more superordinate hierarchy storage levels of the second storage device or mapping the information accordance with the one or more superordinate hierarchy storage levels of the second storage device wherein information mapped in accordance with the one or more superordinate hierarchy storage levels constitute enriched information relative to information mapped in accordance with the one or more subordinate hierarchy storage levels;

a processor configured to link information mapped in accordance with the one or more subordinate hierarchy storage levels in the first storage device to the second storage device to generate enriched information mapped in accordance with the one or more superordinate hierarchy storage levels; and an access mechanism for access to the stored information the information is stored in XML formats.

2. A system in accordance with claim 1, wherein the engineering system is provided for generating of contents and a configuration of the project planning from the project planning information, for transmitting the contents and the configuration of the project planning in the syntax of a markup language, for assigning the contents to the hierarchy levels of the storage devices and for storing the contents in the relevant storage devices.

3. A system in accordance with claim 2, wherein the storage devices are embodied as Web Servers installed on processing units, wherein the scaling of the Web servers is provided depending on the power of the relevant Web server and the processing units each comprise one or more Web servers.

4. A system in accordance with claim 1, wherein the storage devices are embodied as Web Servers installed on processing units, wherein the scaling of the Web servers is provided depending on the power of the relevant Web server and the processing units each comprise one or more Web servers.

5. A system in accordance with claim 1, wherein the project planning information comprises system information of the automation system and project data.

6. A system in accordance with claim 2, wherein the project planning information comprises system information of the automation system and project data.

7. A system in accordance with claim 1, wherein the system is provided for automatically assigning information of the information hierarchy to data.

8. A system an accordance with claim 7, wherein the data are messages from a runtime system.

9. A system in accordance with claim 1, wherein the engineering system is provided for generating the information from a Manufacturing Execution System and/or an Enterprise Resource Planning System.

10. A system for provision of information in an automation system, comprising:

an engineering system for generating information indicative of project planning;

a plurality of storage devices for storing the information in the form of an information hierarchy, wherein the storage devices form hierarchy levels, and further wherein the plurality of storage devices is coupled to the engineering system for performing an automatic project planning;

at least a first storage device of the plurality of storage devices being configured to store one or more subordinate hierarchy storage levels for the information;

at least a second storage device of the plurality of storage devices being configured to store one or more superordinate hierarchy storage levels of the second storage device for the information, wherein the first storage devices is linked to the second storage device to generate information enriched by content in the one or more superordinate hierarchy storage levels; and an access mechanism for access to the stored information, the information is stored in XML formats.

11. A method in accordance with claim 10, wherein the engineering system generating contents and a configuration of the project planning from the project planning information;

transferring the contents and the configuration of the project planning in the syntax of a markup language;

assigning the contents to the hierarchy levels of the storage devices; and storing the contents in the relevant storage devices.

12. A method in accordance with claim 1, wherein the storage devices are embodied as Web servers installed on processing units, wherein the Web server scaling depends on the power of the relevant Web server and the processing units each comprise one or more Web servers.

13. A method in accordance with claim 11, wherein the project planning information comprises system information of the automation system and project data.

14. A method in accordance with claim 10, wherein the storage devices are embodied as Web servers installed on processing units, wherein the Web server scaling depends on the power of the relevant Web server and the processing units each comprise one or more Web servers.

15. A method in accordance with claim 10, wherein the project planning information comprises system information of the automation system and project data.

16. A method in accordance with one of the claim 10, wherein information of the information hierarchy is automatically assigned to messages from a runtime system.

17. A method in accordance with claim 10, wherein the engineering system generates the information from a Manufacturing Execution System and/or an Enterprise Resource Planning System.

* * * * *